L. A. FRANZEN.
GRINDING AND CUTTING MACHINE.
APPLICATION FILED JAN. 26, 1918.
1,306,423.
Patented June 10, 1919.
2 SHEETS—SHEET 1.
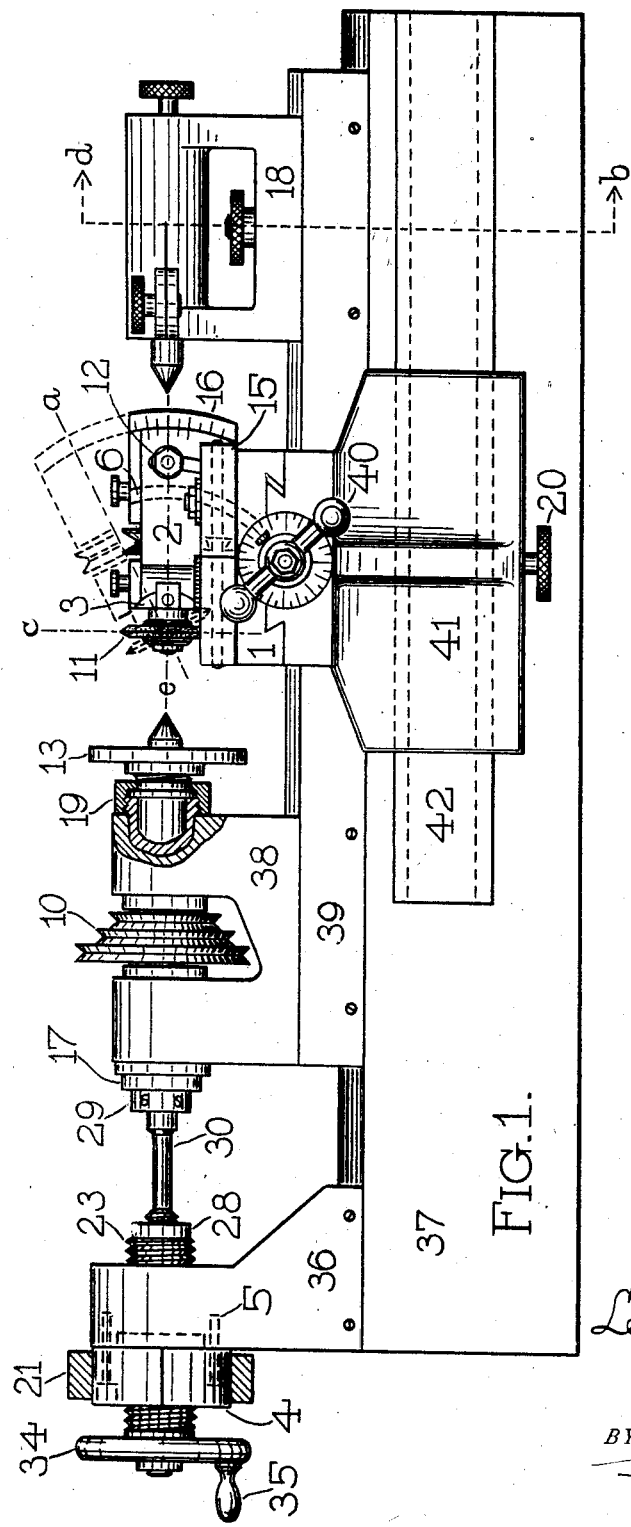
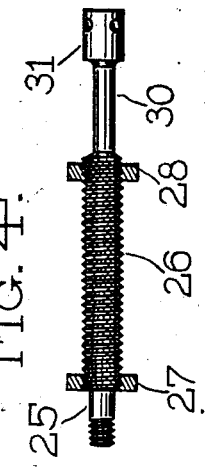
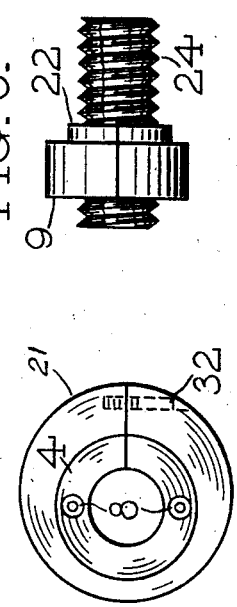
Leonard A. Franzen,
INVENTOR.
BY Frank Carlson
ATTORNEY

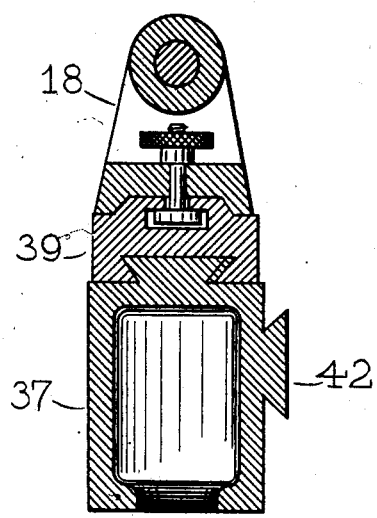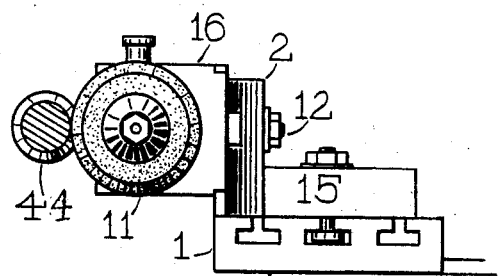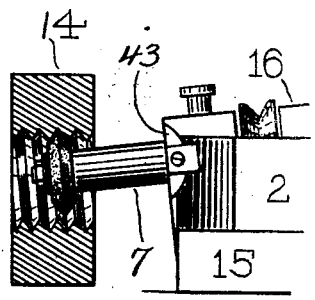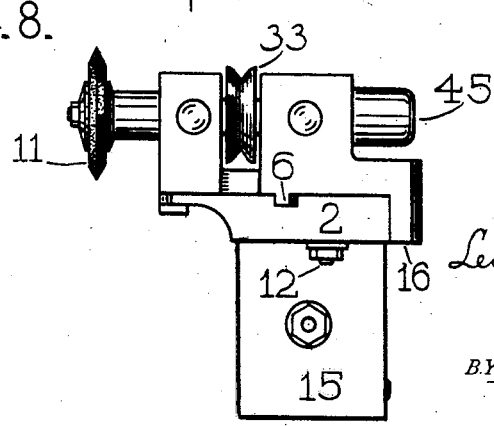

UNITED STATES PATENT OFFICE.

LEONARD A. FRANZEN, OF BROOKLYN, NEW YORK.

GRINDING AND CUTTING MACHINE.

1,306,423.   Specification of Letters Patent.   Patented June 10, 1919.

Application filed January 26, 1918.   Serial No. 213,925.

*To all whom it may concern:*

Be it known that I, LEONARD A. FRANZEN, a subject of King Gustavus V. of Sweden, and a resident of 4918 Seventh avenue, borough of Brooklyn, in the county of Kings, city and State of New York, have invented certain new and useful Improvements in Grinding and Cutting Machines, of which the following is a specification.

This invention relates to thread cutting and grinding machines, and especially to that class wherein the work is mounted between centers which are supported upon a movable common bed which in turn is slidably mounted upon a fixed bed provided at one end with a feed screw to both rotate the work and simultaneously slide the movable bed upon the fixed bed, and provided upon one side with a swiveling grinder adapted to engage the work between the centers.

One advantage of this invention is to provide a grinding and cutting apparatus that can be easily and quickly adjusted to the nicest accuracy.

Another advantage is to provide a machine furnished with a stationary bed bearing thereupon a longitudinally slidable bed guided in its movement by a feed screw mounted on said stationary bed.

Another advantage is to provide an adjustable grinder apparatus which may be accurately adjusted at sight without measuring instruments.

Another advantage is to provide a grinder furnished with a plate whereupon a sharpening device may be supported and guided in engagement with the grinder.

A further advantage is to provide a grinder sharpening device with double adjustments to take up the wear on the same and the differing sizes of grinding wheels.

Further possibilities will become apparent as the specification proceeds.

In the drawings, Figure 1 is a view of an apparatus embodying the present invention with a ring 21 in vertical section. Fig. 2, is an end view of eccentric ring 21 and feed nut 4 of Fig. 1.

Fig. 3 is a view of a feed nut and feed bushing which are interchangeable with nut 4 and bushing 23 of Fig. 1. Fig. 4 is a view of screw spindle 30 of Fig. 1. Fig. 5 is a vertical cross sectional view of Fig. 1 on line *b d*. Fig. 6 is a modification. Fig. 7 is an end view of the part of Fig. 1 above 41 in operative position. Fig. 8 is a plan view of the same part of Fig. 1.

Throughout the views, like numerals refer to the same parts.

Through long experience with screw cutting lathes and other machines for cutting threads, it has been found that these machines are not accurate enough for plug gages, ring gages or the like, when the finished surface is considered. These machines are used for roughing out this kind of work previous to hardening the work, after which a finish is produced by lapping the threads to size with much labor and expensive time.

It is intended to eliminate this labor and waste of time by utilizing the present invention and furthermore to produce a finish and accuracy far superior to anything possible with previous methods.

Referring to the drawings, 37 is a stationary bed supported on a bench or stand by means well known to the trade and superfluous to illustrate. The end block 36 is permanently fixed to bed 37 and supports an internally threaded collar 4 which is fixed to the same by screws as indicated at 5. The collar for this purpose is provided with holes noted 8 and is fitted with exterior eccentric ring 21 which by means of a set screw 32 may tighten collar 4 till it engages feed bushing 23 without any back lash whatever. The bed 39 is slidable along bed 37, being nicely adjusted to prevent all play or rattle, and bears on one end a tail stock 18. Upon the other end is permanently fixed a head stock 38 which bears a hollow shaft 29, into one end of which is fixed the head end 31 of screw spindle 30 by means of set screws, and into the other end which bears face plate 13 is set a center. Shaft 29 is limited between the flange under dust cap 19 and collar 17, and may be rotated by the pulleys 10. It is to be noted that screw spindle 30 may receive interchangeable feed bushings 23 or 24 or any other of a series of like bushings, between the nuts 27 and 28 on thread 26. The wheel 34 may then be fitted on extension 25 and a nut secured outside of it. Naturally, if 24 were to replace 23, the feed nut 9 would also replace nut 4, as the threads are different, each nut, however, being provided with a shoulder 22 to center the same in 26 and using an exterior ring 21 for adjustment. It is seen that the feed screw 30 has a reduced portion between the head and the threaded portion. This is provided to render the shank slightly flexible so that the threads will not bind in case the bushing 23 is not accurately in line with shaft 29.

If the handle 35 be used to rotate shaft 29, the whole bed 39 and all its appurtenances move along on bed 37 in accord with the pitch of the threads in nut 4 and on bushing 23.

On the side of bed 37 is located guide 42 supporting a tool carriage 41 which may be fixed at any point along 42 by the screw 20. Plate 1 is slidably fitted on the carriage 41 and may be drawn in or out over the same by means of handle 40 in a manner similar to tool carriages on any machine lathe. The plate 15 is fixed upon plate 1 by means of a bolt and has a vertical portion 2 of special construction as will appear.

The bearing block of grinder 11 has three shoulders 3, 6 and 16 cut on a radius centering on center lines $c$ and $e$, the rib or shoulder 6 fitting into a corresponding groove in plate 2, while nut 12 secures the grinder in any set position, the markings on 16 and on 2 serving to readily set 2 at any angle at sight. Thus it is easily possible to secure a position indicated at $a$, or even at an opposite angle, the horizontal diametral central line of wheel 11 at all times remaining true to the center line $e$ without any care being necessary to set it central. It is then to be noted that if the grinder is set at the same pitch as that of the feed bushing 23 it will accurately grind a thread on a piece of stock 44. If we lengthen the grinder shaft as at 7 and reduce the wheel diameter, inside threads may be cut, the ring 14 illustrating one form of this class of work. As the shaft 7 is longer the block 16 and extension 43 will conform to an entirely different radius from that in Figs. 1, 7, and 8. The internally threaded ring 54 is not in operative position but is simply hung on the grinder to show the agreement between the wheel and the threads. In the illustrated form of my invention, a belt from a motor or counter-shaft may rotate pulley 33 while pulleys 10 may be rotated from the same power source by another belt at a low speed.

Naturally a gear box might be built into head stock 38 so as to secure the proper low speed and positive drive. However, the form shown clearly reveals that shaft 29 may be manually rotated and be entirely independent of the rotation of the grinder.

It is manifest that some of the details such as dust cap 45 on the grinder or cross feed 1 and 40 are not claimed to be new, nor do I claim them as such. However, modifications such as have been herein mentioned I desire to reserve, and any others within the widest limits commensurate with the scope of my invention.

Having thus fully described my invention, I claim—

1. A grinding and cutting machine including a stationary bed provided with a feed on the end thereof, a slidable bed adapted to travel upon said first bed to and from said feed block, a bearing head upon said slidable bed and a shaft therein adapted to receive a lathe center and face plate, a feed screw spindle secured to the free end of said shaft to rotate the same, an externally threaded feed bushing secured upon said spindle, a corresponding feed nut engaging said bushing secured to said feed block, providing travel of said slidable bed upon said stationary bed by rotation of said feed bushing in said feed nut, said feed nut and bushing being a pair of a series of interchangeable nuts and bushings.

2. A feeding mechanism including a spindle having a threaded portion, a reduced portion and a head, an externally threaded bushing secured upon said threaded portion of the spindle, an internally threaded collar secured partially in a post engaging the thread of said bushing, a clamping ring on said collar near said post and a shaft to be moved along its axis engaging said head of said spindle.

Signed at 132 Nassau street, in the borough of Manhattan, in the county of New York, city and State of New York, this 23rd day of January, 1917.

LEONARD A. FRANZEN.

Witnesses:
ELIAS JOHNSON,
C. F. WM. FORSSBERG.